Figure 1:
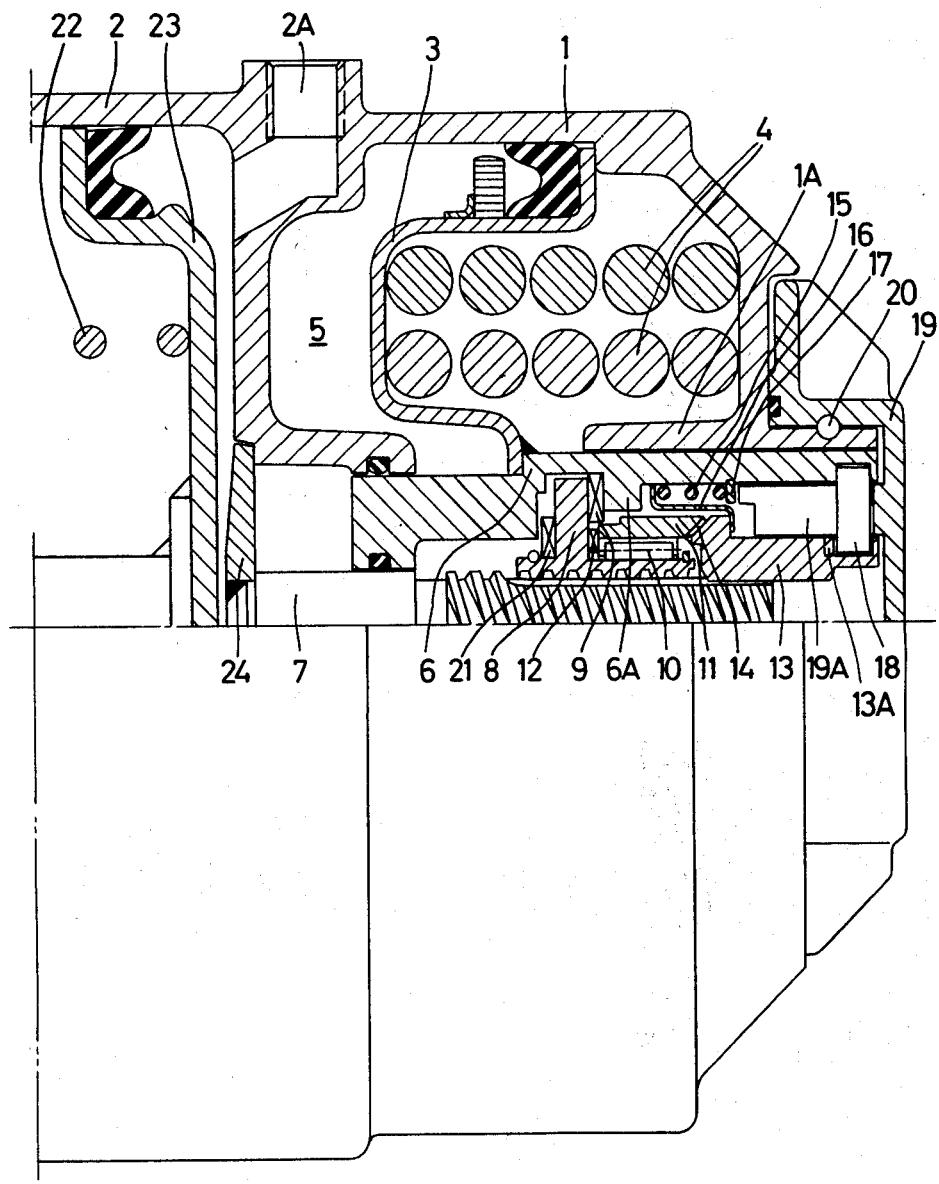

United States Patent [19] [11] 3,994,205
Ekdahl et al. [45] Nov. 30, 1976

[54] DEVICE FOR DISCONTINUING AND AUTOMATICALLY RESTORING THE OPERATIONAL FUNCTION OF A SPRING BRAKE ACTUATOR

[75] Inventors: Egon Kurt Ekdahl, Barseback; Michel Roger; Nils Borje Lennart Sander, both of Malmo, all of Sweden

[73] Assignee: Svenska Aktiebolaget Bromsregulator, Malmo, Sweden

[22] Filed: Jan. 20, 1975

[21] Appl. No.: 542,612

[30] Foreign Application Priority Data
Jan. 30, 1974 Sweden .............................. 7401174

[52] U.S. Cl. ........................................ 92/29; 92/17; 92/30; 92/63; 92/113; 92/129; 92/130 A; 188/170
[51] Int. Cl.[2] ......................................... F15B 15/26
[58] Field of Search ................. 92/3, 14, 17, 23, 29, 92/30, 63, 64, 113, 116, 129, 130 A; 188/170; 192/111 A

[56] References Cited
UNITED STATES PATENTS

| | | |
|---|---|---|
| 2,632,426 | 3/1953 | Geesink ............................ 92/113 X |
| 3,051,136 | 8/1962 | Muelhausen ...................... 92/129 X |
| 3,472,124 | 10/1969 | Roselius ............................. 92/17 X |
| 3,576,152 | 4/1971 | Chevreux ........................ 188/170 X |
| 3,704,653 | 12/1972 | Higgins ........................... 188/170 X |
| 3,738,229 | 6/1973 | Kraft ..................................... 92/17 |
| 3,782,251 | 1/1974 | Le Marchand ........................ 92/63 |
| 3,878,924 | 4/1975 | Nadas ................................. 188/203 |

Primary Examiner—Martin P. Schwadron
Assistant Examiner—Abraham Hershkovitz
Attorney, Agent, or Firm—Laurence R. Brown

[57] ABSTRACT

An actuator for a spring brake used for parking and emergency has a spring operating on the brake push rod which will apply braking unless fluid pressure in the braking system applied to a piston overcomes spring pressure. To disable the spring brake the rod is retracted by a mechanism coupling the piston to the rod so that the brake is automatically restored into service when the piston is operated by the fluid pressure. The mechanism has a one-way clutch engaging a threaded push rod by means of a nut in non-self-locking engagement on the push rod threads.

4 Claims, 2 Drawing Figures

DEVICE FOR DISCONTINUING AND AUTOMATICALLY RESTORING THE OPERATIONAL FUNCTION OF A SPRING BRAKE ACTUATOR

A conventional spring brake actuator comprises a cylinder, a piston, and a spring actuating the piston. The spring is normally held compressed by fluid pressure acting on the piston, and at a pressure fall the spring will force the piston, which is connected to further parts of a vehicle brake rigging, in a brake applying direction. Such an actuator is normally used as a parking and emergency brake actuator for a vehicle and is in such a case attached to a service brake actuator, whose piston will be actuated by a push rod of the spring brake actuator.

If the vehicle has to be moved in the absence of fluid pressure for the spring brake actuator it is necessary to relieve the force from the spring on the brake rigging. One way to accomplish this is to compress the spring manually by means of an external tool engaging the piston or the push rod. This work is however both tiresome and time-consuming. Another and in most cases preferred way is to disengage the push rod from the piston, so that the push rod can be retracted. A requirement is that the normal function of the actuator shall be restored automatically after the return of fluid pressure for the spring compression.

This invention thus relates to a device for discontinuing and automatically restoring the operational function of a spring brake actuator, comprising a cylinder, a piston, a push rod, a spring actuating the piston in an operation direction forward for brake application at the fall of a fluid pressure acting on the other side of the piston, and a conveying mechanism between the piston and the push rod, which mechanism at the piston movement forward is arranged to convey the push rod but is disconnectable for making possible a return of the push rod alone at a carried forward piston and is arranged to return automatically to a position for again conveying the push rod after the piston return.

Such devices are known but are marred by certain disadvantages, such as being complex, expensive or, last but not least, less reliable.

The object of the present invention is to accomplish a device of the kind referred to which is extremely simple and cheap but still very reliable and easy to control manually.

This is according to the invention attained in that the conveying mechanism comprises a nut, which has a non-self-locking engagement with screw-threads on the push rod, is actuated in the operation direction, by the piston and is connected to a rotationally immovable member of the actuator via a one-way clutch preventing the nut from rotating in the operation direction as well as an externally disengagable spring-loaded dog clutch between the one-way clutch and said member.

This means that the dog clutch will be held in continuous engagement during all normal operation of the spring brake actuator and thus that no parts of the conveying mechanism move relative to each other under normal conditions, making the device very reliable. The dog clutch is not in the force-transmitting path from the piston to the push rod, and vice versa, and is only preventing the nut from rotating under normal conditions. The dog clutch is only mechanically disengaged at the disconnection of the piston and the push rod, so that the latter may be returned to its initial position under the influence of the return spring in the brake rigging, especially the return spring in the service brake actuator.

It is to be noted that the spring brake actuator need not be connected to a service brake actuator. In many cases it is preferred to dispense with the service brake actuator and to use the spring brake actuator also for service braking. In such cases there may be springs in the brake rigging for the return of the push rod, or else the push rod may be retracted manually after the disconnection of the piston and the push rod.

In a practical embodiment of the invention the one-way clutch is arranged between the nut and a clutch ring, whereas the rotationally immovable member, which together with the clutch ring constitutes the dog clutch, is axially movably arranged on the push rod and is urged against the clutch ring by means of a spring. In this embodiment there is a control mechanism for transforming a turning movement on an exterior control member to an axial disengagement movement of the rotationally immovable member via a control pin in a an oblique groove.

Figure 2:
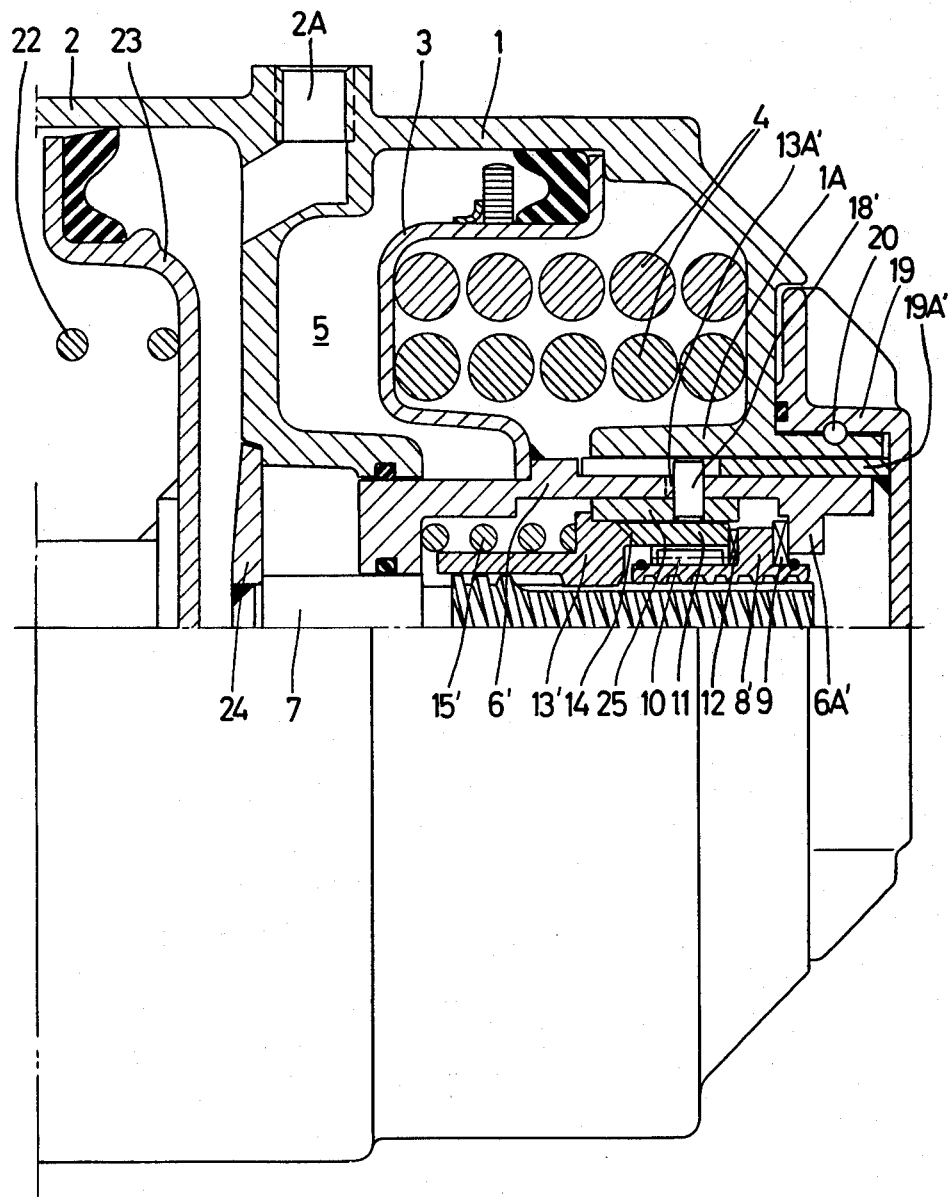

The invention shall be described in further detail below, reference being made to the accompanying drawings, in which:

FIG. 1 is a partly sectional view of a practical embodiment of the invention, and FIG. 2 is a corresponding view of a modification of this embodiment.

Referring first to FIG. 1 a spring brake cylinder 1 is attached to a service brake cylinder 2 provided with an inlet 2A for service brake fluid. A spring brake piston 3 is acted upon by on one side a spring 4 and on the other side fluid pressure in a fluid chamber 5, whose fluid inlet is not shown. The central part of this piston 3 can be called a piston rod 6 and is guided for axial movements by an opening in the service brake cylinder end wall and a tubular extension 1A of the spring brake cylinder end wall. A screw-threaded push rod 7 is arranged in the tubular piston rod 6, and a nut 8 is in non-self-locking engagement with the push rod 7.

At a fall of the fluid pressure in the chamber 5 the force from the spring 4 will be transmitted to the nut 8 via the piston 3, the piston rod 6, a force-transmitting piston rod flange 6A and a first anti-friction bearing 9. The said force will also be transmitted to the push rod 7 (as well as to further parts of the vehicle brake rigging) provided that the nut is held against rotation on the push rod 7. This is the case under all normal circumstances, and the means for accomplishing this will be described below.

A one-way clutch 10, which in the preferred embodiment is in the form of a free-wheel mechanism but also may be a locking spring or the like, is arranged between the nut 8 and a clutch ring 11 as shown. The clutch ring 11 is rotationally journalled relative to the nut 8 by means of a second anti-friction bearing 12 and is provided with teeth at its end facing from the nut 8. These teeth are intended for cooperation with corresponding teeth on a clutch sleeve 13, the teeth together constituting a dog clutch 14. The clutch sleeve 13 is axially movable but rotationally immovable by being provided with an inwardly extending projection in engagement with an axial groove in the push rod 7. The dog clutch 14 is held engaged by means of a helical compression spring 15 arranged between a spring sleeve 16 and a locking ring 17 in the piston rod 6.

The clutch sleeve 13 is provided with an oblique control groove 13A for a control pin 18, which is also extending into a circumferential groove in the piston rod 6 with at least the same length as the control groove. An exterior control member 19 is arranged at the end of the cylinder 1 and may be turned relative to the same in that there is a circumferential groove in the cylinder extension 1A engaged by a guide pin 20 in the control member 19. This member 19 is provided with a tubular sleeve 19A with an axial or longitudinal slot for the control pin 18 as shown. It is evident that by this arrangement it is possible to disengage the dog clutch 14 from the outside. At a turning of the control member 19 the control pin 18 will move in the circumferential groove in the piston rod 6 and the oblique groove 13A in the clutch sleeve 13, so that the latter will be moved to the right in the Figure relative to the piston rod 6 and thus relative to the control ring 11.

At normal operation the nut 8 is thus prevented from rotating by the rotationally immovable clutch sleeve 13 via the one-way clutch 10, the clutch ring 11 and the dog clutch 14, the locking direction of the one-way clutch 10 being such that it prevents rotation of the nut 8 when the actuator spring force is applied to it over the piston rod flange 6A, whereas during the return stroke under the influence of increasing fluid pressure in the fluid chamber 5, the piston 3 with associated parts will move to the right in the Figure at the same time as the push rod 7 moves in the same direction under the influence of a return spring 22 for a service brake piston 23 until the shown position is reached again.

If after a pressure fall in the fluid chamber 5 and thus a normal application, when the whole mechanism has moved a certain distance to the left in the Figure, no fluid pressure is available for the bringing back of the same to its shown initial position, it is possible to disengage the dog clutch 14 against the action of the spring 15 by turning the control member 19 and thus by moving the clutch sleeve 13 to the right in the Figure in its axial groove in the push rod 7. The nut 8 will now be free to rotate on the push rod 7 with the result that the piston 3 will move to its extreme left position under the influence of the spring 4, and that under the influence of a return spring in the vehicle brake rigging, for example the return spring 22, the push rod 7 will be moved to the right in the Figure until a stop plate 24 on the push rod 7 will prevent further movement, i.e. until the push rod has reached its shown initial position.

Under the influence of the spring 15 the dog clutch 14 will be re-engaged when the control member 19 is released. However, at the return of fluid pressure in the fluid chamber 5 for the compression of the spring 4 the nut 8 will be actuated by the piston 3 via a third anti-friction bearing 21, and will rotate to the right on the push rod 7 due to the one-way clutch 10, which is free in this direction. The mechanism will thus at the end assume the position shown and will automatically be ready for normal operation.

A modification of this embodiment is shown in FIG. 2. Corresponding parts have here been provided with the same numerals as in FIG. 1, if necessary with the addition of a prime for modified parts. Thus the basic difference between the embodiment according to FIG. 1 and the modification according to FIG. 2 is that in the latter case the one-way clutch 10, the clutch ring 11 and the modified clutch sleeve 13' are placed to the left of the modified nut 8', which is acted upon by the flange 6A' of the modified piston rod 6' via the antifriction bearing 9. The dog clutch 14 is held engaged by a modified spring 15' between the piston rod 6' and the clutch sleeve 13'. The control mechanism for the dog clutch 14 is modified to enable a movement to the left of the clutch sleeve 13'. The control member 19 is thus provided with a modified tubular sleeve 19A' with an axial or longitudinal slot for the modified control pin 18' as shown. The oblique control groove, here called 13A', is arranged in the piston rod 6', and the control pin 18' is extending into a control tube 25 coating with the control sleeve 13' and moving the same to the left at the turning of the control member 19 in the absence of fluid pressure in the fluid chamber 5.

No description of the operation for the modified actuator is necessary; it has only to be noted that the locking direction of the one-way clutch 10 is such that it allows rotation of the nut 8' on the push rod 7 to the right in the Figure.

Further modifications are of course possible within the scope of the appended claims.

What is claimed is:

1. Means for selectively releasing and thereafter automatically restoring braking in a spring brake actuator comprising in combination, a piston, a threaded push rod movable by the piston to operate the brakes, a spring for moving the piston in a direction applying the brakes, brake release means conveying a force to the piston to move it against the force of said spring to release the brakes, and a conveying mechanism coupled between the piston and push rod for moving said push rod with movement of said piston in a brake applying direction including a selectively operable release mechanism for disconnecting said push rod from said piston and automatically reconnecting it upon said brake release means conveying a force to said piston thereby overcoming the force of said spring, said release mechanism comprising, a nut in non-self-locking engagement on threads on said push rod transmitting braking force from said piston to said rod and rotatable only when the release mechanism disconnects said push rod from said piston, a clutch normally holding said nut rotationally immovable, said clutch comprising one clutch surface on said nut and a rotationally immovable sleeve member disengaged from said piston presenting a mating clutch surface, means moving said sleeve member to disengage said clutch thereby permitting the push rod to move independently of said piston while said nut rotates thereon, and return means permitting said nut to rotate when brakes are applied to reposition said push rod.

2. Means defined in claim 1, wherein said return means comprises a one way clutch mechanism.

3. Means defined in claim 1, wherein said sleeve member is axially movable on said push rod.

4. Means defined in claim 1, wherein said means moving the sleeve member comprises a rotatable mechanism positioned about said push rod connected to axially move said sleeve member.

* * * * *